William F. Fuller,
INVENTOR.

William F. Fuller,
INVENTOR.

United States Patent Office 3,447,326
Patented June 3, 1969

3,447,326
FLUID INJECTOR, SELF-COMPENSATING FOR LATERAL ACCELERATION
William F. Fuller, Riverside, Calif., assignor, by mesne assignments, to the United States of America as represented by the Secretary of the Army
Filed Apr. 10, 1967, Ser. No. 629,825
Int. Cl. F16j 15/16; F16k 41/00; E21b 33/00
U.S. Cl. 60—251    4 Claims

ABSTRACT OF THE DISCLOSURE

An injector for use in hybrid motors or liquid-controlled solid propellant motors. The injector includes a substantially spherical head having a nozzle disposed thereon in communication with the interior of the head and extending into the longitudinal perforation of the propellant to inject liquid oxidizer across the propellant grain. The head is provided with means for displacement thereof responsive to and at a magnitude proportional to lateral accelerations acting on the rocket, to direct flow of the oxidizer in substantially equal distribution across the propellant grain to assure even and complete combustion thereof. A bearing means is carried in the support for the head to provide substantially frictionless movement of the head and to provide a seal for the head.

Cross-reference to related applications

The device of the present invention is similar in principle to the device disclosed in U.S. Patent No. 3,260,047, issued to Mr. Lawrence W. Kesting on July 12, 1966 and assigned to the United States of America; however, the present invention is an improvement over the device of U.S. Patent No. 3,260,047.

Background of the invention

In the combustion of a hybrid motor, a liquid (usually the oxidizer—although in a reversed hybrid it is the fuel) is injected into the bore to a solid charge. The flow characteristics of the liquid; such as mass rate velocity, turbulence, boundary layer, thickness droplet size and distribution within the free stream and along the surface of the bore of the solid charge, must be maintained within narrow limits for maximum combustion efficiency. The efficiency drops rapidly to a premature flameout when the oxidizer spray pattern is disrupted or misdirected. A requirement exists, therefore, to maintain a near constant spray pattern relative to the solid propellant grain bores under all operating conditions.

If the rocket, and thus the combustion chamber thereof, is subjected to lateral accelerations, the oxidizer stream will be deflected, thus leaving portions of the grain bore out of the area of coverage of the injected oxidizer and also impairing the flow characteristics of the injected oxidizer.

Summary of the invention

Apparatus of the present invention includes mechanism which compensates for lateral accelerations acting on a rocket by displacing the injector head proportional to and responsive to accelerations acting on the rocket and thus maintain the desired flow characteristics of the injected oxidizer to assure substantially even distribution of the oxidizer over the propellant surface. A bearing means is carried in the support for the head to provide substantially frictionless movement thereof and to provide a seal for the head.

It is, therefore, an object of the present invention to provide apparatus for injection of an oxidizer in the bore of a solid propellant motor.

It is a further object of the present invention to provide apparatus for maintaining desirable flow characteristics of free-flowing fluids even when such fluids are subjected to undesirable accelerations.

It is still a further object of the present invention to provide such apparatus for injection of an oxidizer in the bore of a hybrid or solid propellant rocket motor and to assure substantially equal distribution of the oxidizer over the internal surface of the propellant even when the rocket is subjected to lateral acceleration.

It is yet a further object of the present invention to provide such apparatus with means for displacement thereof at a magnitude proportional to the accelerations so that responsive to the displacement the injected liquid is substantially equally distributed over the internal surface of the propellant.

It is another object of the present invention to provide such apparatus with bearing surfaces which will provide substantially frictionless and leak free engagement of the parts during the displacement of the apparatus.

Other objects and many attendant advantages of this invention will be readily appreciated as the same becomes better understood by reference to the following detailed description taken in conjunction with the accompanying drawing.

Description of the preferred embodiments

Figure 1:
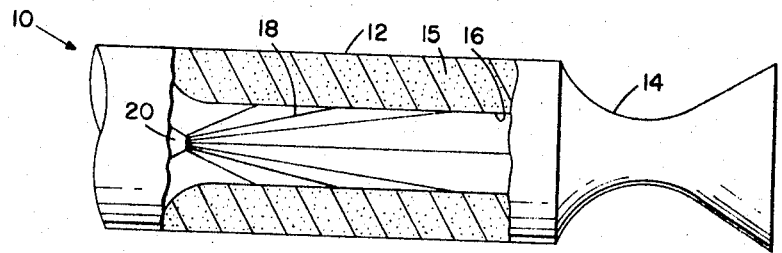
FIGURE 1 is an elevational sectional view of a solid propellant rocket motor illustrating an ideal spray pattern of an oxidizer into the bore of the solid propellant.

Referring now to FIGURE 1 of the drawing, a rocket is generally designated by the numeral 10 and is shown to include a motor 12 having a nozzle 14. Motor 12 is shown to have an annular solid propellant grain 15 provided with an axial bore 16 therethrough. A liquid oxidizer 18 is disposed for injection into the bore by means of an injection apparatus 20.

It is to be understood that while the motor of the present invention is shown to have a propellant grain and a liquid oxidizer, this is for illustrative purpose only, and if desirable, the solid charge may be composed of oxidizer or of other propellant and the injected liquid may be fuel. In any event, the use of either alternative is encompassed by the inventive concept of the present invention.

The apparatus of the present invention is disposed to maintain desirable flow characteristics of the injected liquid in a spray pattern approaching ideal even when the rocket is subjected to lateral accelerations.

As shown in FIGURE 1, the injector is mounted in the rocket motor in a manner which provides that the center line of propellant spray is coincident with the center line of the rocket motor for substantially equal distribution of the propellant or oxidizer across the grain of the propellant.

Figure 2:
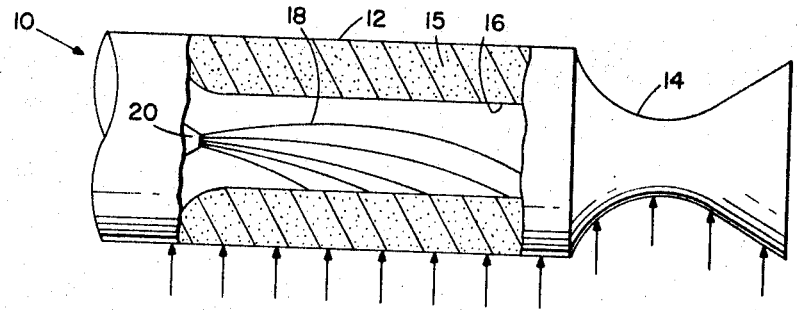
FIGURE 2 is a view similar to FIGURE 1 illustrating the spray pattern of a fixed, nonmovable injector when the rocket is subjected to accelerations.

FIGURE 2 illustrates the effect of lateral accelerations on the propellant of oxidizer spray from a stationary injector.

Figure 3:
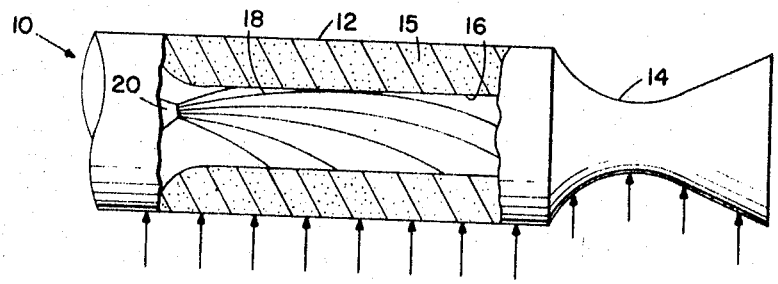
FIGURE 3 is a view similar to FIGURE 2 illustrating the spray pattern of the movable injector of the present invention.

FIGURE 3 illustrates the self-compensating injector of the present invention in a displaced position responsive to lateral acceleration acting on the rocket.

Figure 4:
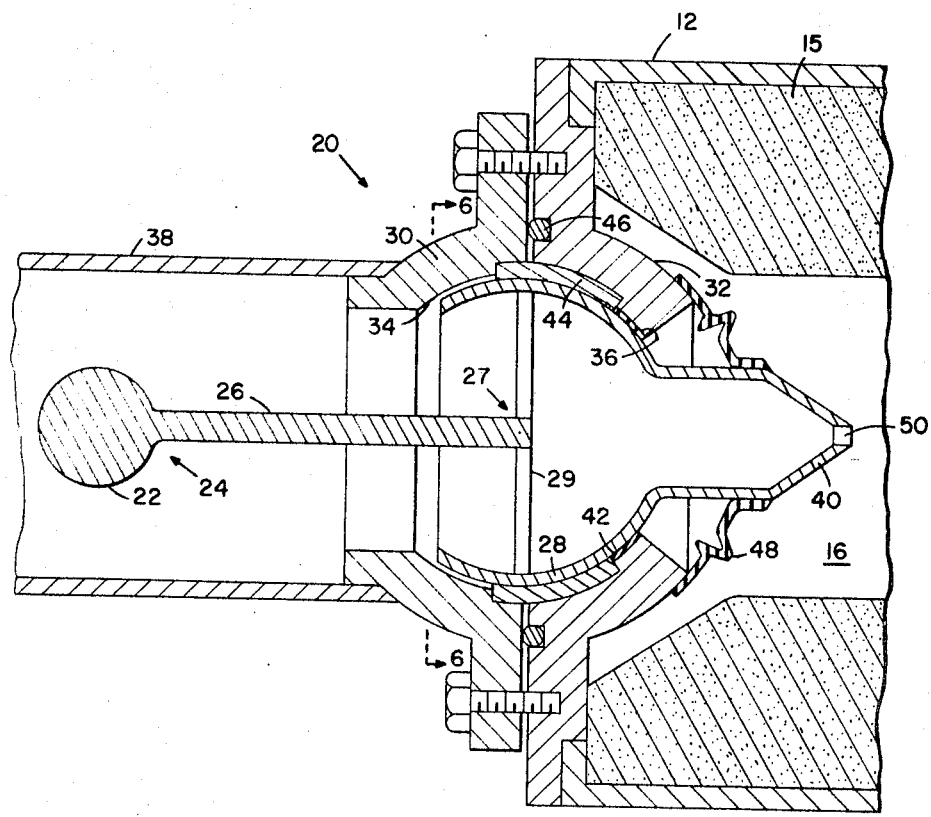
FIGURE 4 is an elevational sectional view of the self-compensating injector of the present invention as carried in a rocket motor.

As shown in FIGURE 4, the injector apparatus 20 includes a spherical balance weight 22 disposed at one end 24 of an elongated member 26. The other end 27 of member 26 extends into a hollow substantially spherical injector head 28. A plurality of radially extending arms 29 are secured to end 27 of member 26 and to the interior surface of injector head 28 to mount balance weight 22 in the assembly.

Head 28 is mounted in a pair of support members 30 and 32 having arcuate interior seating surfaces 34 and 36, respectively. The interior surfaces are shaped to conform to the spherical surface of the injector head to permit the pivotal movement thereof.

A propellant inlet tube 38 is secured to member 30 and disposed in communication with the oxidizer container (not shown) and the interior of spherical head 28 to supply the liquid oxidizer therein.

A nozzle 40 is secured to the spherical head and in communication with the interior thereof to inject the liquid oxidizer into bore 16 of the propellant.

To provide substantially frictionless support of the head in support members 30 and 32 to permit ease of pivotal movement of the head, a coating 42, such as tetrafluoroethylene resins, known as Teflon, is disposed on the interior surface of support member 32, and an annular braided copper packing 44 is provided in members 30 and 32. Coating 42 and the braided copper packing is chosen for compatibility with the liquids used and also aids in sealing the joint. Additional sealing is provided by the use of O-ring seals 46 disposed between members 30 and 32.

An elastic flexure member 48 is secured to member 32 and to the exterior surface of the nozzle. Member 48 may be metallic in substance or an elastomer such as rubber or flexible plastic material. The member may be described as a continuous spring which provides proportional resistance to change of injector position from the neutral in a direct relation to accelerations acting in any directional normal to the center line of the rocket motor and permits the axis of the propellant spray to remain parallel to the center line of the rocket motor under all lateral accelerations to enhance the efficient utilization of the solid propellant grain. Member 48 is mounted at the forward portion of the injector and remote from the mainstream of propellant entering the injector.

In operation, the oxidizer is supplied, under pressure, through tube 38 and into head 28 for flow through opening 50 of nozzle 40 into bore 16 of motor 12 for substantially equal distribution across propellant grain 15.

Figure 5:
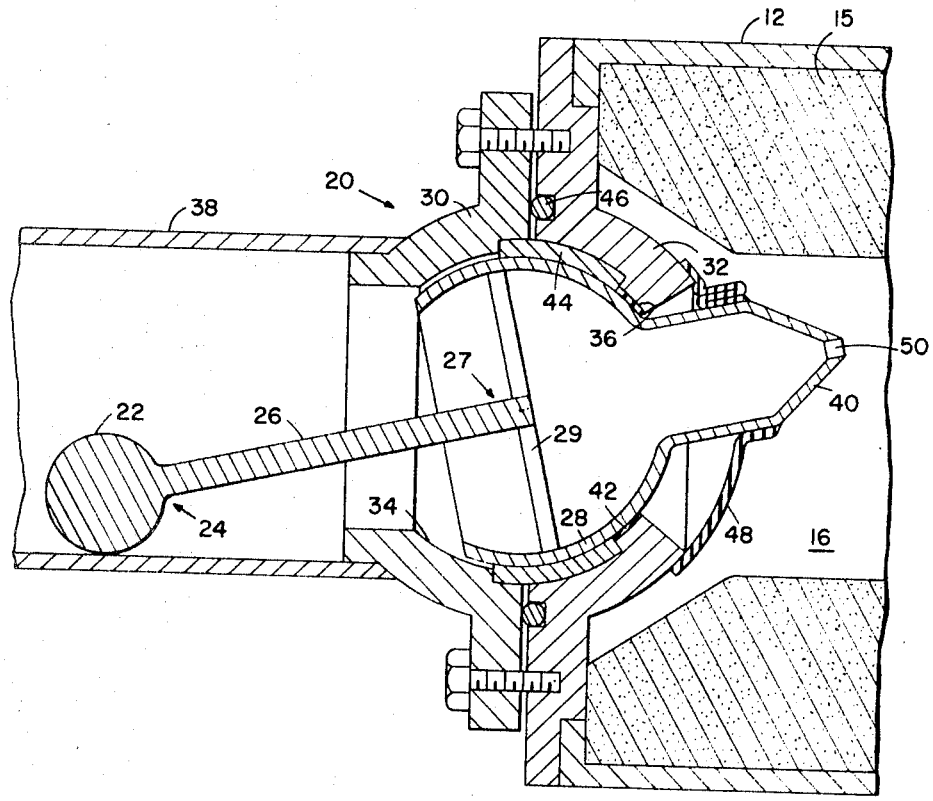
FIGURE 5 is a view similar to FIGURE 4 illustrating the self-compensating action of the device of the present invention when the device is subjected to lateral accelerations.
Figure 6:
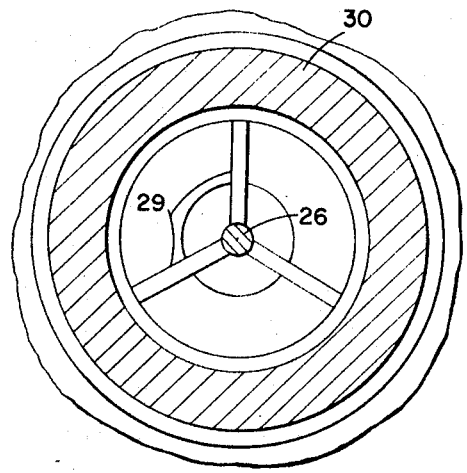
FIGURE 6 is a view along line 6—6 of FIGURE 4.

As shown in FIGURE 5, missile or rocket 10 is shown to be under the influence of lateral accelerations. Such accelerations displaces spherical balance weight 22 in the opposite direction of the accelerations, against the restraining action of flexure member 48. Due to the rigid connection between weight 22 and spherical head 28, the spherical head is forced to rotate in members 30 and 32 for pivotal movement of the head and nozzle in the direction of the accelerations. With oxidizer flowing into head 28 through the tube 38 and out of opening 50 of the nozzle, the injectant spray assumes the configuration as illustrated in FIGURE 3 in which substantially equal distribution of the oxidizer occurs across the propellant grain. Once the accelerations cease to exist, the apparatus is returned to a balanced condition by virtue of flexure member 48 urging the apparatus back to the balance condition.

While the self-compensating injector apparatus has been described herein in conjunction with hybrid or liquid-controlled solid propellant rocket motors, it is to be understood that the principle of the invention may be extended to be included in many control devices utilizing free jets of fluids. For example, fluid amplifiers utilize a free jet which is deflected to various receiving channels. Certain types of accelerations are based upon a conductive free-flowing stream. These devices, when mounted upon a carrier which is rotated or maneuvered, could be subjected to lateral accelerations relative to the free fluid path that would impair their performance. The injector of the present invention will self-compensate for this alteration.

Obviously, many modifications and variations of the present invention are possible in light of the above teachings. It is, therefore, to be understood that within the scope of the appended claims, the invention may be practiced otherwise than as specifically described.

What is claimed is:

1. In a rocket having a solid propellant motor provided with a central bore therethrough and a liquid oxidizer for injection in said bore for substantially equal distribution across the grain of said propellant even during periods of transverse accelerations acting on said rocket, means for providing substantially even distribution of said oxidizer across the propellant grain during said accelerations comprising: a hollow, substantially spherical head disposed in communication with said oxidizer and having a nozzle portion disposed thereon in communication with the interior of said head and extending into said bore for injecting said oxidzer therein; support means for pivotal support of said head; means secured to said head to effect the pivotal movement thereof responsive to the accelerations; biasing means secured to said nozzle portion and to said support means for limiting the movement of said head to a magnitude proportional to the accelerations, said biasing means including a flexible elastic member secured to said support means and said nozzle, exteriorly of said head and remote from the flow of oxidizer entering said head, a first bearing means coated on the interior of said support means; a second bearing means carried on said support means, said first and second bearing means disposed to provide substantially frictionless support of said head in said support means for ease of pivotal movement of said head and also disposed to provide substantially leak free movement of said head.

2. The device of claim 1 wherein said means secured to said head to effect the pivotal movement thereof comprises a spherical weight secured to said head in cantilevered relation therewith.

3. The device of claim 2 wherein said first bearing member is a coating of a tetrafluoroethylene resin.

4. The device of claim 3 wherein said second bearing means is of copper braided material.

References Cited

UNITED STATES PATENTS

| 2,158,131 | 5/1939 | Laurent | 285—271 XR |
| 2,383,679 | 8/1945 | Phillips | 285—271 |
| 2,424,897 | 7/1947 | Orshansky | 285—266 XR |
| 3,096,128 | 7/1963 | Wight. | |
| 3,101,961 | 8/1963 | White. | |
| 3,260,047 | 7/1966 | Kesting | 60—234 |

CARLTON R. CROYLE, *Primary Examiner.*

U.S. Cl. X.R.

239—265.35; 277—30, 100; 308—237, 238